(12) United States Patent
Careglio et al.

(10) Patent No.: US 11,317,228 B2
(45) Date of Patent: Apr. 26, 2022

(54) SYSTEM FOR THE DETECTION OF NOISE

(71) Applicant: HORUS S.R.L., Alba (IT)

(72) Inventors: Giovanni Careglio, Alba (IT); Norberto Bertaina, Alba (IT); Roberto Ferretti, Alba (IT)

(73) Assignee: Horus S.r.l., Alba (IT)

( * ) Notice: Subject to any disclaimer, the term of this patent is extended or adjusted under 35 U.S.C. 154(b) by 165 days.

(21) Appl. No.: 16/606,125

(22) PCT Filed: Apr. 18, 2018

(86) PCT No.: PCT/IB2018/052682
§ 371 (c)(1),
(2) Date: Oct. 17, 2019

(87) PCT Pub. No.: WO2018/193388
PCT Pub. Date: Oct. 25, 2018

(65) Prior Publication Data
US 2020/0053497 A1    Feb. 13, 2020

(30) Foreign Application Priority Data

Apr. 18, 2017   (IT) .......................... 102017000042380

(51) Int. Cl.
*H04L 29/06* (2006.01)
*H04Q 9/00* (2006.01)
(Continued)

(52) U.S. Cl.
CPC ............ *H04R 29/008* (2013.01); *G10L 25/51* (2013.01); *H04L 67/12* (2013.01); *H04L 67/42* (2013.01);
(Continued)

(58) Field of Classification Search
CPC . G01R 33/3657; G01R 33/3614; G01F 22/00; H04R 29/008; H04R 1/08; H04L 67/12; H04L 67/42
See application file for complete search history.

(56) References Cited

U.S. PATENT DOCUMENTS

2010/0295672 A1   11/2010  Hyland et al.
2012/0196527 A1*   8/2012  Lagrange ................ H04L 45/70
                                              455/9
(Continued)

FOREIGN PATENT DOCUMENTS

ES         2384059 A1     6/2012

*Primary Examiner* — Iqbal Zaidi
(74) *Attorney, Agent, or Firm* — David B. Tingey; Bryant J. Keller; Kirton McConkie

(57) ABSTRACT

The system comprises: a remote control station; a plurality of detection devices for the detection of noise which are located inside an area to be monitored; a master device adapted to receive noise level data from the detection devices and adapted to send the data to the remote control station, the master device being provided with a client communication module configured to communicate with the remote control station and with an access point communication module configured to communicate with one of the detection devices; wherein each of the detection devices is provided with a client communication module configured to communicate with the access point communication module of the master device, the detection devices and the master device being located in predetermined positions and in a substantially homogeneous manner inside said area for the detection of noise level data which are certifiable and homogeneous both in terms of spatial distribution and in terms of time distribution.

19 Claims, 2 Drawing Sheets

(51) Int. Cl.
*H04R 1/08* (2006.01)
*H04W 40/20* (2009.01)
*H04W 84/18* (2009.01)
*H04R 29/00* (2006.01)
*G10L 25/51* (2013.01)
*H04L 29/08* (2006.01)
*H04L 67/12* (2022.01)
*H04L 67/01* (2022.01)

(52) U.S. Cl.
CPC .................. *H04Q 9/00* (2013.01); *H04R 1/08* (2013.01); *H04W 40/20* (2013.01); *H04Q 2209/40* (2013.01); *H04W 84/18* (2013.01)

(56) References Cited

U.S. PATENT DOCUMENTS

| | | | |
|---|---|---|---|
| 2014/0071851 A1* | 3/2014 | Plainchault | H04B 7/0617 370/254 |
| 2015/0326953 A1 | 11/2015 | Todasco | |
| 2018/0270291 A1* | 9/2018 | Burton | H04L 43/0876 |

* cited by examiner

| Element No. | Term From Specification |
|---|---|
| 1 | System for the Detection of Noise |
| 2 | Remote Control Station |
| 3 | Detection Device |
| 4 | Area to be Monitored |
| 5 | Master Device |
| 6 | Client Communication Module |
| 7 | Access Point Communication Module |
| 8 | Client Communication Module |
| 9 | Internet Connection Means |
| 10 | Remote Connection Means |

Fig. 2

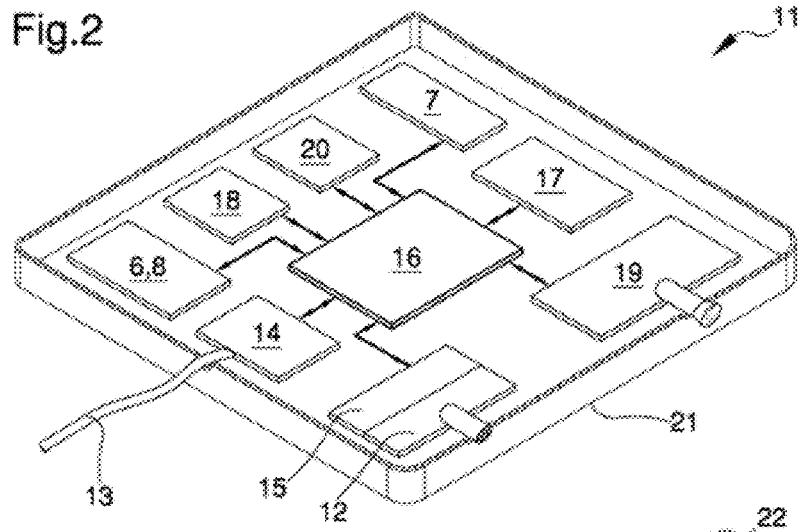

Fig. 3

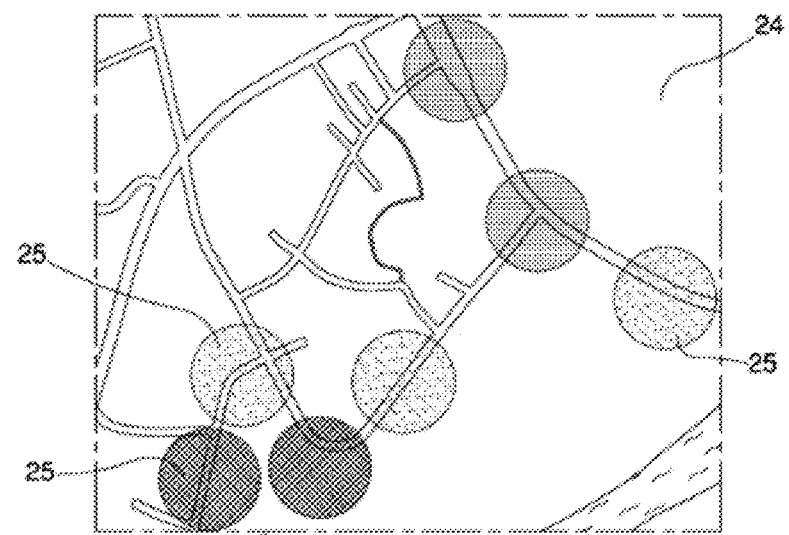

| Element No. | Term From Specification |
|---|---|
| 6 | Client Communication Module |
| 7 | Access Point Communication Module |
| 8 | Client Communication Module |
| 11 | Generic Device |
| 12 | Microphone |
| 13 | Power Supply |
| 14 | Rechargeable Battery |
| 15 | Amplification and Acquisition Circuitry |
| 16 | Microprocessor |
| 17 | Data Memory |
| 18 | GPS Module |
| 19 | Micro Camera |
| 20 | Real-Time Clock |
| 21 | Watertight Container |
| 22 | Interface Means |
| 23 | Web Interface |
| 24 | Map |
| 25 | Acoustic Intensity Markers |

SYSTEM FOR THE DETECTION OF NOISE

TECHNICAL FIELD

The present invention relates to a system for the detection of noise.

BACKGROUND ART

With particular, but not sole reference to the field of urban and territorial planning, various systems are known for the detection of noise which are adapted to monitor noise pollution.

Noise pollution has long been underestimated, perhaps also because of the nature of its effects, which are less obvious and not permanent compared to those caused by other forms of environmental pollution.

In recent years, however, there has been a growing consensus that noise is one of the main causes of the deterioration of the quality of life in cities, so much so that the Green Paper of the European Commission on future policies on noise pollution dated 1996 defines noise as the fifth source of concern for the local environment after traffic, air pollution, landscape conservation and waste management.

Noise pollution particularly affects metropolitan areas where high levels of noise are generally reached which can cause annoyance or even damage to the hearing system.

In fact, in metropolitan areas, the high density of commercial and industrial areas, where working hours also last for long periods of time, means that the population is exposed for a long time to high levels of noise.

More specifically, according to some studies, although the noise tolerance limit for individuals is 65 dB, about 20% of the population of the European Union is exposed to continuous daytime outdoor noise which exceeds this limit.

Furthermore, over 40% of the population of the European Union is exposed to noise levels between 55 and 65 dB, levels considered as alert values due to which serious disturbances may already occur.

The known noise detection methodology currently used by local authorities, such as municipalities, provinces or regions, is mainly based on sample noise measurements carried out by a specialized operator charged with gathering data, in areas of specific interest and over specific periods of time.

Noise detection systems are also known based on open source or crowdsourcing projects and supported by free and no-charge access smartphone applications which enable all registered users to gather data wherever they are and at any time.

The data are sent to a server over the Internet and are gathered to create interactive maps from which the way noise evolves, district by district, day by day, can be observed.

The main drawback in the use of these types of system is tied to the fact that the measurements made have no legal value and do not constitute a reliable reference since they are carried out in an uneven manner over the area and using devices not suitable for certified surveys.

DESCRIPTION OF THE INVENTION

The main aim of the following invention is to provide a system for the detection of noise which allows taking certified measurements in any area and which are uniform both in terms of spatial distribution and in terms of time distribution.

Within this aim, one object of the following invention is to provide a system for the detection of noise, which permits gathering all the measured data in a historical file of easy reference and use.

Another object of the present invention is to provide a system for the detection of noise, which allows overcoming the aforementioned drawbacks of the prior art within the scope of a simple, rational, easy, efficient to use and cost-effective solution.

The aforementioned objects are achieved by the present system for the detection of noise having the characteristics of claim 1.

BRIEF DESCRIPTION OF THE DRAWINGS

Other characteristics and advantages of the present invention will become more evident from the description of a preferred, but not exclusive embodiment of a system for the detection of noise, illustrated by way of an indicative, but non-limiting example, in the attached drawings in which:

FIG. 2 is a block diagram illustrating a device of the system according to the invention;

FIG. 3 is a view of a possible form of a web interface according to the invention.

EMBODIMENTS OF THE INVENTION

Figure 1:
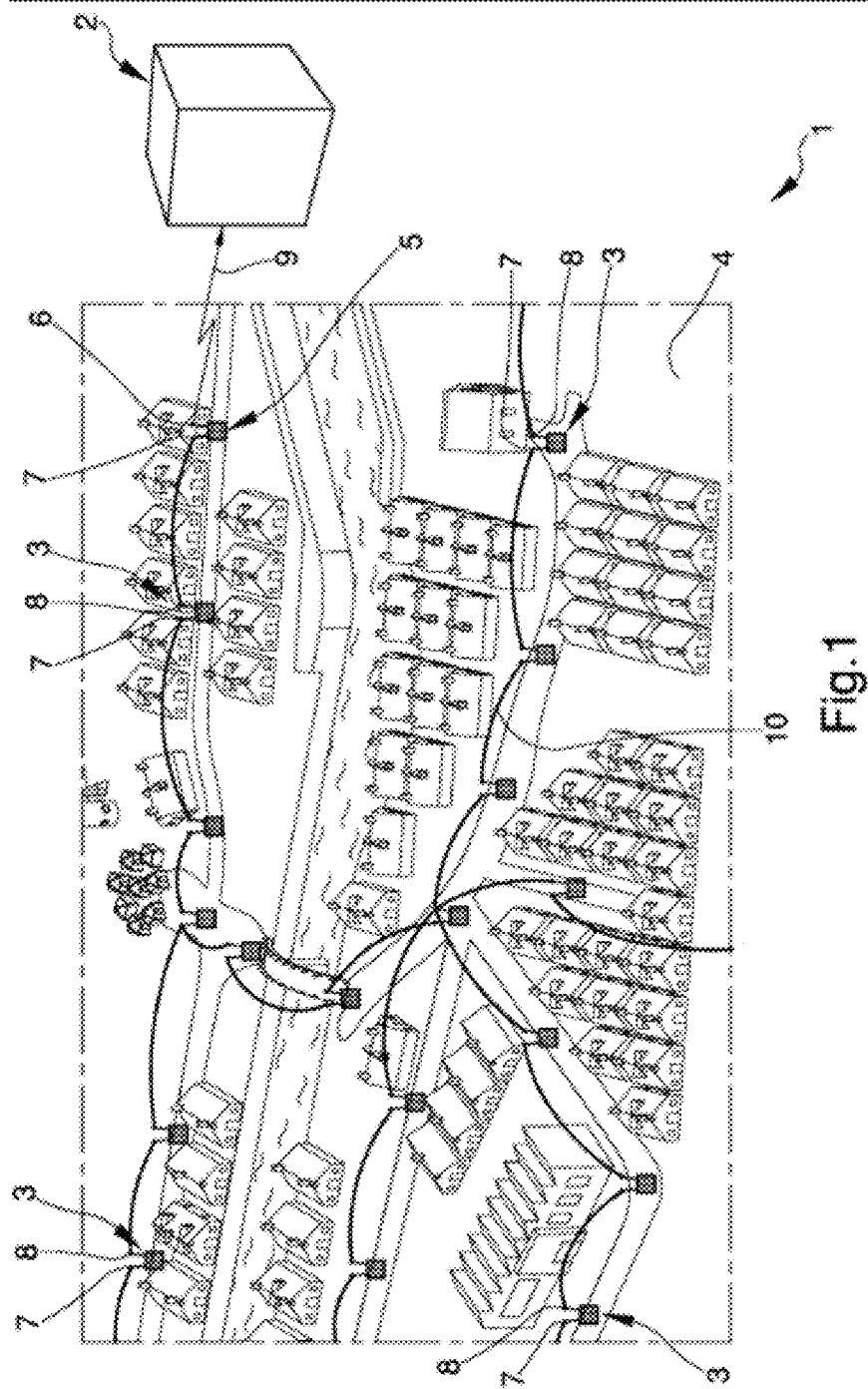
FIG. 1 is a block diagram illustrating, by way of example, a possible embodiment of the system according to the invention.

With particular reference to these illustrations, reference numeral 1 globally indicates a system for the detection of noise.

The system 1 comprises:
at least a remote control station 2;
at least a plurality of detection devices 3 for the detection of noise which are located inside an area 4 to be monitored.

The system 1 also comprises at least a master device 5 adapted to receive noise level data from the detection devices 3 and adapted to send the data to the remote control station 2.

In particular, the master device 5 is provided with a client communication module 6 configured to communicate with the remote control station 2 and with an access point communication module 7 configured to communicate with at least one of the detection devices 3.

Each of the detection devices 3 is provided with a client communication module 8 configured to communicate with the access point communication module 7 of the master device 5.

Advantageously, the detection devices 3 and the master device 5 are located in predetermined positions and in a substantially homogeneous manner inside the area 4, in order to detect noise level data which are certifiable and homogeneous both in terms of spatial distribution and in terms of time distribution.

Specifically, the client communication modules 6, 8 and the access point communication modules 7 are meant as identical electronic modules which are distinguished according to their communication configuration and according to the detection device 3 or to the master device 5 on which they are mounted.

With particular reference to the embodiment shown in the illustrations, at least one of the detection devices 3 comprises an access point communication module 7 configured to communicate with at least one of the other detection devices 3.

The client communication module 6 configured to communicate with the remote control station 2 is provided with Internet connection means 9 and the client communication modules 8 configured to communicate with the access point communication modules 7 communicate with the access point communication modules 7 by interposition of the remote connection means 10.

Furthermore, at least one of the Internet connection means 9 and the remote connection means 10 is of the wired or wireless type.

Specifically, all the client communication modules 8 and all the access point communication modules 7 are connected via WiFi network and only the client communication module 6 is connected, again via WiFi network, to the Internet and in communication with the remote control station 2.

Alternative Internet connection means 9 cannot also be ruled out, e.g. via the telephone network and dedicated SIM card.

Moreover, according to a possible and preferred embodiment of the system 1, shown in FIG. 1, the master device 5 and all the detection devices 3 are provided with two communication modules: one of the client type and one of the access point type.

In particular, FIG. 2 shows a generic device 11 which is used according to requirements as a detection device 3 or as a master device 5.

The generic device 11 used as a detection device 3 is provided with a client communication module 8 configured to communicate with another generic device 11.

The generic device 11 used as a master device 5, on the other hand, is provided with a client communication module 6 configured to communicate with the remote control station 2.

This way, it is possible to create a network of detection devices 3 capable of communicating with each other for forwarding data to the master device 5.

Alternative embodiments cannot however be ruled out in which the number of communication modules associated with each detection device 3 and with each master device 5 is different, e.g. in which the master device 5 is provided with a client communication module and with an access point communication module, while every other detection device 3 is only provided with the client communication module configured for the communication with the access point communication module of the master device; this particular solution will obviously only be possible if the range of the access point communication module is such to reach all the client communication modules.

Furthermore, the possibility cannot be ruled out to install client/access point communication modules with a different WiFi range, from a minimum of 30 to 50 meters up to a maximum of 300 meters, to be used according to needs. Specifically, as shown in FIG. 1, each detection device 3 transmits the noise level data collected to the master device 5 which in turn transmits them to the remote control station 2.

In the event of the detection device 3 being at a distance such that direct communication with the master device 5 is not possible, the data are transmitted to the next detection device 3 closest to the master device 5 in such a way as to create a cascade process which transmits the data through several detection devices 3, until they reach the master device 5 through which pass all the data going to the remote control station 2.

Alternative embodiments cannot however be ruled out in which several master devices 5 are used for the transmission of data to the remote control station 2. Each generic device 11 used as a detection device 3 comprises one configuration/management step of the detection devices 3 and of the master device 5 to make a mapping of at least one route.

The route comprises a possible succession of connections of detection devices 3, terminating with a connection to the master device 5.

More specifically, the configuration/management step maps every possible succession of connections between detection devices 3 that terminates with a connection to any master device 5.

This way, each detection device 3 locates every other detection device 3 and every other master device 5 within the network in which it is installed.

The configuration/management step is repeated every time another generic device 11 is introduced into or leaves the network, e.g., due to a fault.

Furthermore, each generic device 11 used as a detection device 3 comprises at least one routing step of the noise level data through the detection devices 3 of the route up to the master device 5.

The routing step determines which of the routes mapped during the configuration/management step is better to use to send the noise level data.

In summary, the configuration/management step and the routing step enable each detection device 3 to route the noise level data following a given path according to the evolution of the network conditions in a dynamic manner.

In fact, not only do the two joint steps deal with possible failures of the generic devices 11 belonging to the network, but also with variations in the flow of data and/or in the reliability rate of given remote connection means 10.

Alternative embodiments cannot however be ruled out wherein, given the size of the area to be monitored, the network has to be subdivided into different cells, each of which comprising various detection devices 3 and master devices 5.

Each generic device 11 which is part of the same network cell is coded with the name of the group to which it belongs.

The service set identifier (SSID), therefore the name of the network that will be available on each device, will consist of the group name (which is the same for all the generic devices 11 of the group) and of a univocal part which is the serial number of the generic device 11.

Once a generic device 11 is activated, at any point inside the group, a mapping process begins of the surrounding network cells which are announced with the same name of the group.

The device will therefore connect to the detection devices 3 reachable that allow it to reach the master device 5 for the transmission of data to the remote control station 2.

The remote control station 2 is an Internet-connected server and is configured to receive the noise level data from the master device 5.

In particular, the detection devices 3 and the master device 5 comprise a microphone 12 adapted to detect noise.

More specifically, the generic device 11 weighs approx. from 120 grams to 150 grams.

The generic device 11 comprises a 230 V power supply 13, connected to a public or private fixed structure, IP installations or other fixed installations (Public Administrations): a rechargeable battery 14 that supplies power to the device during power failure periods.

Furthermore, the generic device 11 comprises an analogue amplification and acquisition circuitry 15 for the detection of the noise relating to the microphone 12: frequency range between 40 and 12000 Hz with microphone sensitivity and quality which can b adapted to the reading needs.

Advantageously, the generic device 11 can be equipped with a microprocessor 16 for processing the acquired signal, any storage of short sequences and the management of the connection.

In addition, the generic device 11 can be equipped with a considerably large data memory 17 for any storage of long recording periods.

Conveniently, the generic device 11 can be equipped with a WiFi client communication module 6, 8 for the connection to the next point.

Moreover, the generic device 11 can be equipped with a WiFi access point communication module 7 with a mode for the connection to the previous point.

Usefully, the generic device 11 can be equipped with a GPS module 18 for the functions of geo localization and precise positioning on the map where the data are displayed.

In addition to this, the generic device 11 can be equipped with a micro camera 19 for the possible acquisition of images or short video sequences.

Moreover, the generic device 11 can be equipped with a real-time clock 20 for the management of time and date.

In addition, the generic device 11 can be equipped with a watertight container 21 made of plastic material suitable for outdoor use IP68.

Preferably, the watertight container 21 is square in shape with rounded corners, of reduced dimensions (side of about 5.6 cm and thickness slightly more than that of a smartphone) and does not have external keys or controls.

On the outside of the watertight container 21 are the microphone 12, the connectors for the power supply 13 and the possible micro camera 19.

Advantageously, on the outside of the watertight container 21 it is possible to associate a photovoltaic solar panel adapted to supply the generic device 11.

In general, the generic device 11 is prepared in different configurations according to need, so that alternative embodiments cannot be ruled out wherein the detection devices 3 and/or the master devices 5 are provided with several components, e.g. with two micro cameras 19 and two microphones 12, or in which the watertight container 21 is manufactured in different sizes and/or materials to suit different placement areas.

Furthermore, alternative embodiments cannot be ruled out wherein the system 1 is hybrid, comprising Wi-Fi generic devices 11 as supposed thus far, with high performances and the possibility of processing, storing and transferring large amounts of data and cheaper auxiliary generic devices with the only real time function of analyzing the noise, so as to require a reduced amount of memory, and able to produce a minimum amount of already summarized data of the analysis carried out.

These auxiliary generic devices 11 comprise a radio module operating in the ISM band (433/868 MHz).

This way, it is possible to extend the detection area at a lower cost with respect to the cost of installing new Wi-Fi generic devices 11 which, given their functionality, are equipped with particularly expensive hardware components. These features make the system 1 extremely flexible and capable of monitoring a wide variety of areas, such as e.g.:

urban type outdoor areas (squares, gardens and surface areas surrounded by buildings);
surround-free open areas (sports fields, large areas);
semi-open areas (stadiums, arenas);
large indoor areas (indoor sports stadiums, theaters);
medium and reduced size indoor areas (workshops, laboratories).

Advantageously, the system 1 comprises interface means 22 for the graphical display of the noise level data.

Specifically, the interface means 22 comprise a web interface 23 which allows displaying in a graphic and numerical form the data detected by the detection devices 3 and by the master devices 5 installed inside the area 4.

The web interface 23 allows also displaying reports on the noise level data collected by each generic device 11.

Advantageously, the reports can be printed and/or sent to other terminals connected to the network of generic devices 11.

Moreover, the web interface 23 represents the geographical position of the detection devices 3 and of the master devices 5 and allows displaying the data with respect to the acquisition times defining four display modes:
live, so the noise is displayed in real time;
daily, so the noise is displayed as the daily average;
weekly, so the noise is displayed as the weekly average;
annual, so the noise is displayed as the annual average.

Advantageously, each display mode shows the data related to each hour of the day and allows storing the view of the area on which the results are being displayed so as to make it easy to compare the data detected in the different areas of interest.

Specifically, the interface means 22 comprise at least one map 24 adapted to graphically represent the area 4 to be monitored and a plurality of acoustic intensity markers 25 to represent different values of the noise level.

As shown in FIG. 3, the acoustic intensity markers 25 are of varying color intensity depending on the data relating to the represented noise level.

Besides the "map" and "satellite" display mode of area 4, various display options are available which are suitable for the different types of analysis to be carried out.

The web interface 23 also allows viewing additional information relating to the detection devices 3 and to the master devices 5, including the identifier of the selected device, the GPS coordinates relating to positioning, and its location, e.g., outside or inside a building.

Moreover, through the web interface 23 it is possible to program the system 1 in such a way as to store a number of audio tracks and some photo frames in the instant when a pre-established noise threshold set by an operator is exceeded; this way it is possible to carry out subsequent analyses on the causes that led to the threshold being exceeded.

It has in practice been found that the described invention achieves the intended objects.

In particular, the fact is underlined that through the possibility of creating a capillary network of multiple detection devices and master devices interlinked with each other, it is possible to carry out measurements which are certified on any area and uniform both in terms of spatial distribution and in terms of time distribution.

In particular, the small size and flexible configuration of the various devices allows the easy installation of a system for the detection of noise and the even simpler expansion of already installed systems.

Moreover, thanks to the possibility of saving all the measured data on a server, a historical file can be created which is easy to refer to and use.

More specifically, the presence of a web interface accessible from different devices makes the display, processing and comparison of the measured data easy.

The invention claimed is:

1. A system comprising:
   at least a remote control station;
   at least a plurality of detection devices for a detection of noise which are located inside an area to be monitored; and
   at least a master device adapted to receive noise level data from said detection devices and adapted to send said data to said remote control station, said master device being provided with at least a client communication device configured to communicate with said remote control station and with at least an access point communication device configured to communicate with at least one of said detection devices,
   wherein each of said detection devices is provided with at least a client communication device configured to communicate with said access point communication device of the master device, said detection devices and said master device being located in predetermined positions and in a substantially homogeneous manner inside said area for a detection of noise level data which are certifiable and homogeneous both in terms of spatial distribution and in terms of time distribution, and
   wherein at least one of said detection devices comprises at least one routing process of said noise level data through said detection devices of said route to said master device.

2. The system according to claim 1, wherein at least one of said detection devices comprises at least an access point communication device configured to communicate with at least another of the detection devices.

3. The system according to claim 2, wherein at least one of said detection devices and said master device comprises at least a microphone.

4. The system according to claim 2, wherein said client communication device configured to communicate with said remote control station is provided with an Internet connection and said client communication devices configured to communicate with said access point communication modules communicate with said access point communication devices through a remote connection.

5. The system according to claim 2, wherein at least one of said Internet connection and said remote connection is of a wired or wireless type.

6. The system according to claim 2, wherein at least one of said detection devices comprises at least one configuration/management process of said detection devices and of said master device to make a mapping of at least a route comprising a possible succession of connections of said detection devices, said route terminating with a connection to said master device.

7. The system according to claim 1, wherein at east one of said detection devices and said master device comprises at least a microphone.

8. The system according to claim 7, characterized by the fact that said client communication device module configured to communicate with said remote control station is provided with an Internet connection and said client communication devices configured to communicate with said access point communication devices communicate with said access point communication devices through a remote connection.

9. The system according to claim 7, wherein at least one of said Internet connection and said remote connection is of a wired or wireless type.

10. The system according to claim 7, wherein at least one of said detection devices comprises at least one configuration/management process of said detection devices and of said master device to make a mapping of at least a route comprising a possible succession of connections of said detection devices, said route terminating with a connection to said master device.

11. The system according to claim 1, wherein said client communication device configured to communicate with said remote control station and said client communication devices configured to communicate with said access point communication devices communicate with said access point communication devices through at least one of an Internet connection and a remote connection.

12. The system according to claim 11, wherein the at least one of said Internet connection and said remote connection is of a wired or wireless type.

13. The system according to claim 1, wherein at least one of said detection devices comprises at least one configuration/management process of said detection devices and of said master device to make a mapping of at least a route comprising a possible succession of connections of said detection devices, said route terminating with a connection to said master device.

14. The system according to claim 1, wherein said remote control station comprises Internet-connected server and is configured to receive said noise level data from at least one of said master devices.

15. The system according, to claim 1, comprising an interface for a graphical display of said noise level data.

16. The system according to claim 15, wherein said interface for the graphical display of said noise level data comprises at least a web interface.

17. The system according to claim 15, wherein said interface for the graphical display of said noise level data comprises at least a map adapted to graphically represent said area to be monitored and at least a plurality of acoustic intensity markers to represent different noise level values.

18. The system according to claim 17, wherein said acoustic intensity markers are of varying color intensity depending on a represented noise level data.

19. The system according to claim 1, wherein at least one of said Internet connection and said remote connection is of a wired or wireless type.

* * * * *